April 30, 1968   C. R. GOOD ET AL   3,380,506
MOVABLE SPACE DIVIDER STRUCTURE
Filed July 29, 1963   13 Sheets-Sheet 1
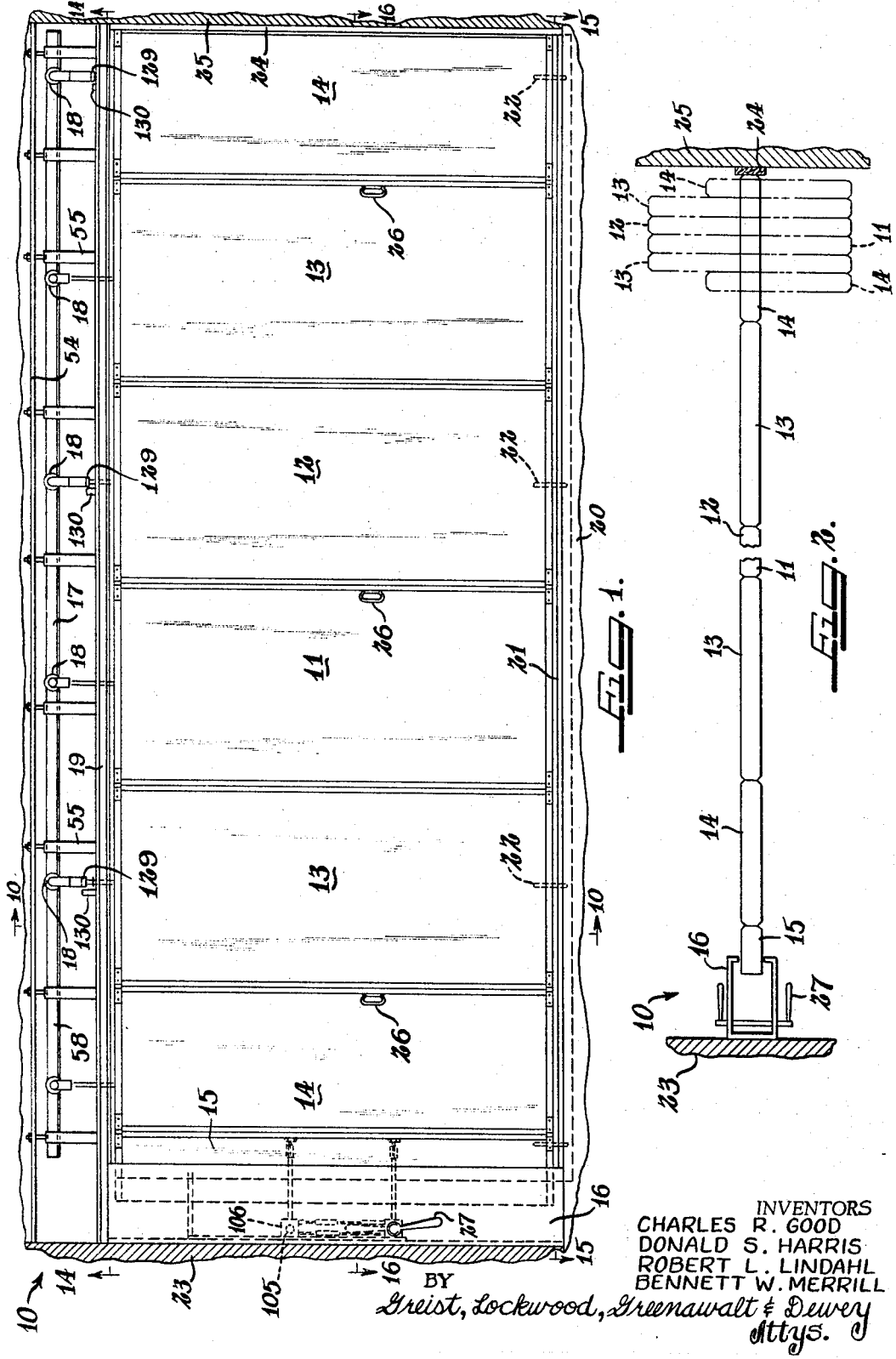
INVENTORS
CHARLES R. GOOD
DONALD S. HARRIS
ROBERT L. LINDAHL
BENNETT W. MERRILL
BY
Greist, Lockwood, Greenawalt & Dewey
Attys.

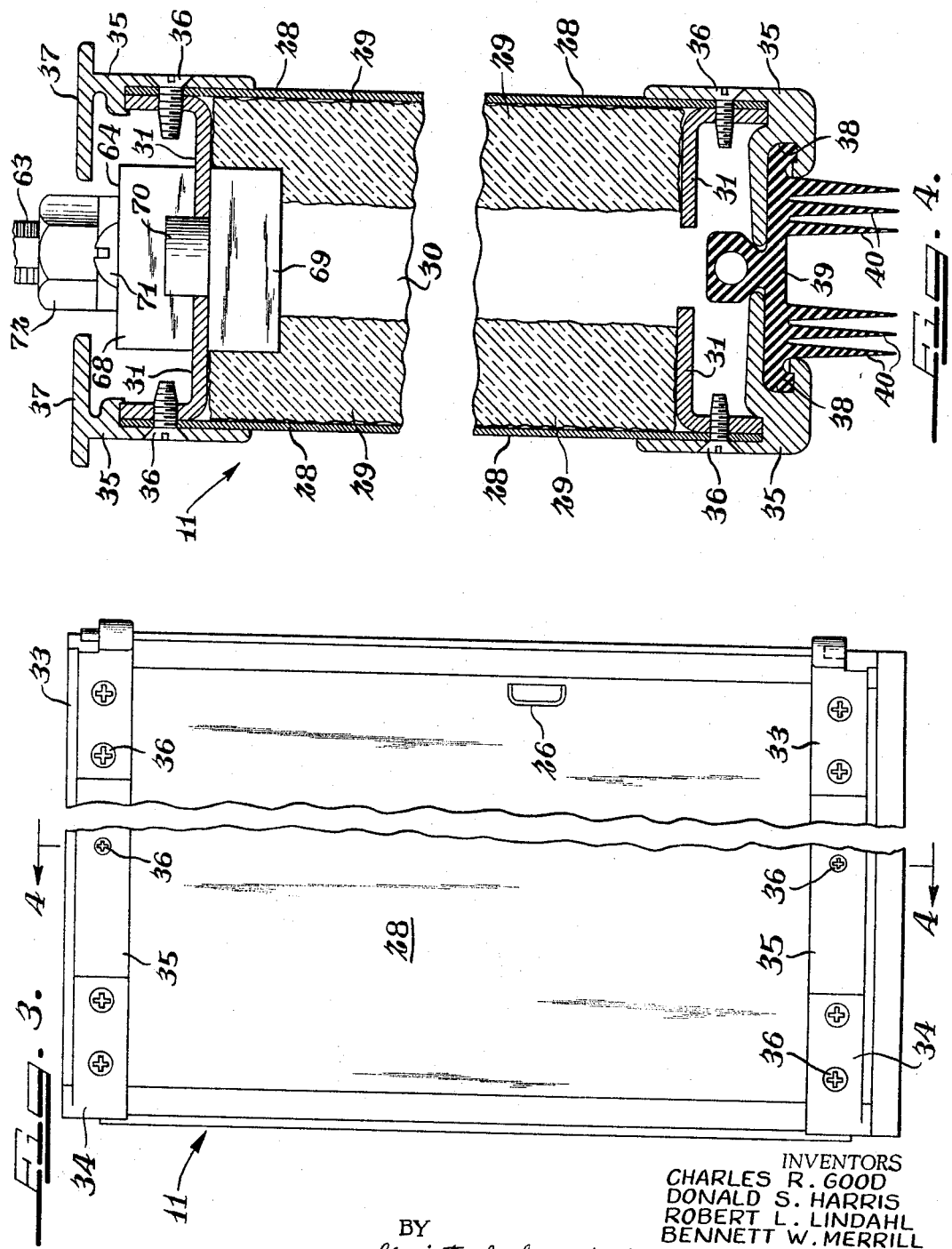

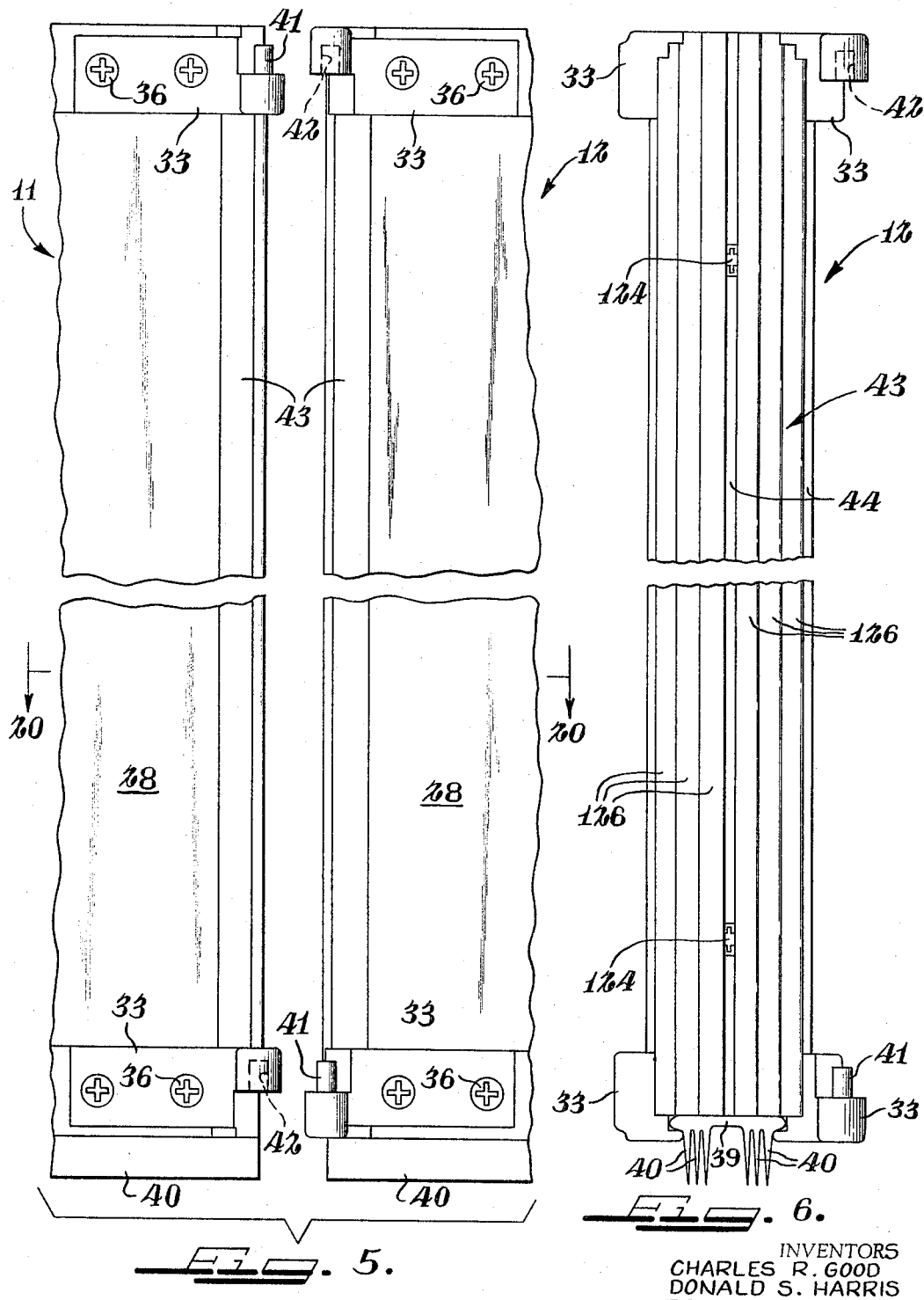

April 30, 1968  C. R. GOOD ET AL  3,380,506
MOVABLE SPACE DIVIDER STRUCTURE
Filed July 29, 1963  13 Sheets-Sheet 4
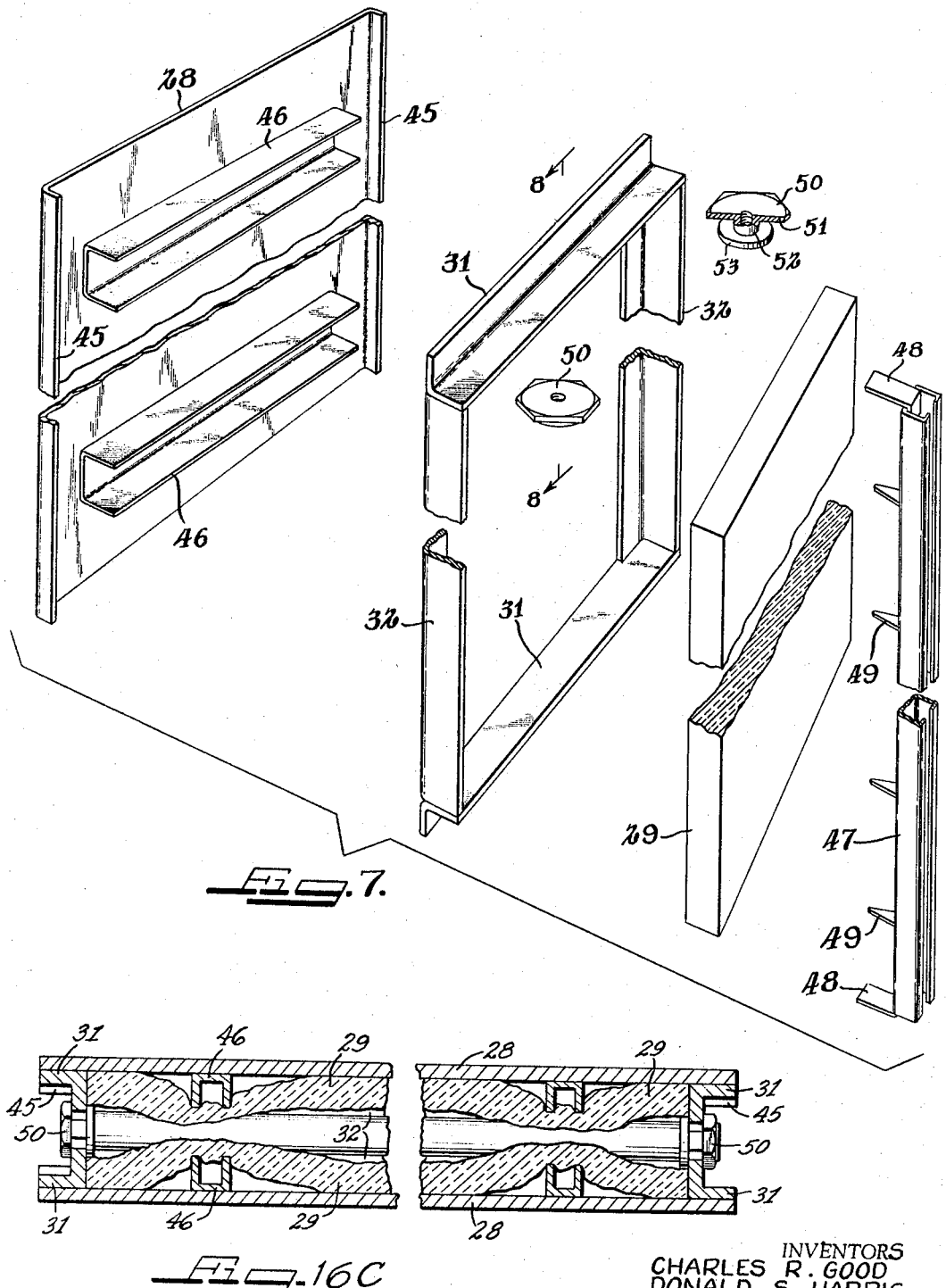
INVENTORS
CHARLES R. GOOD
DONALD S. HARRIS
ROBERT L. LINDAHL
BENNETT W. MERRILL
BY Greist, Lockwood, Greenawalt & Dewey
Attys.

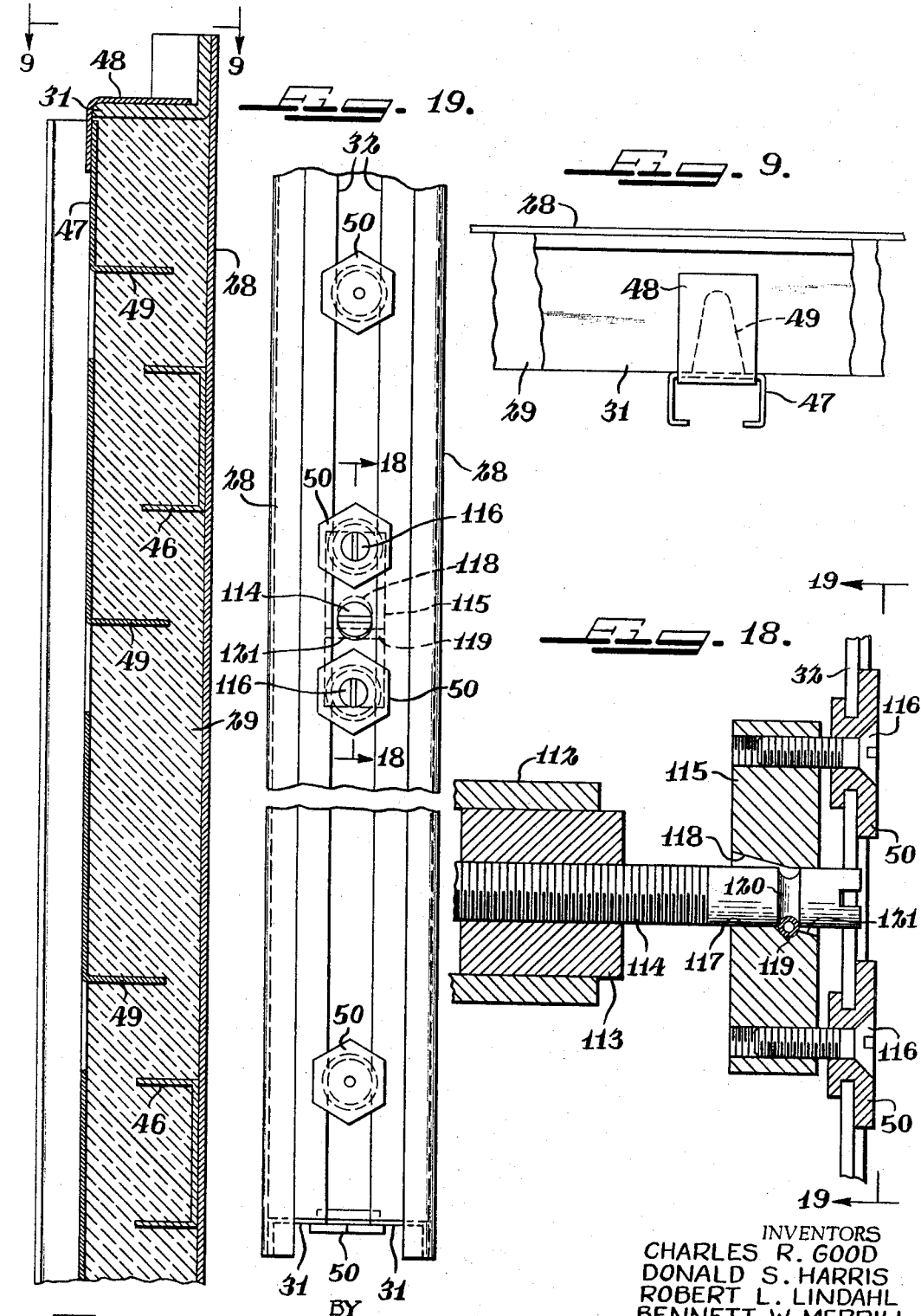

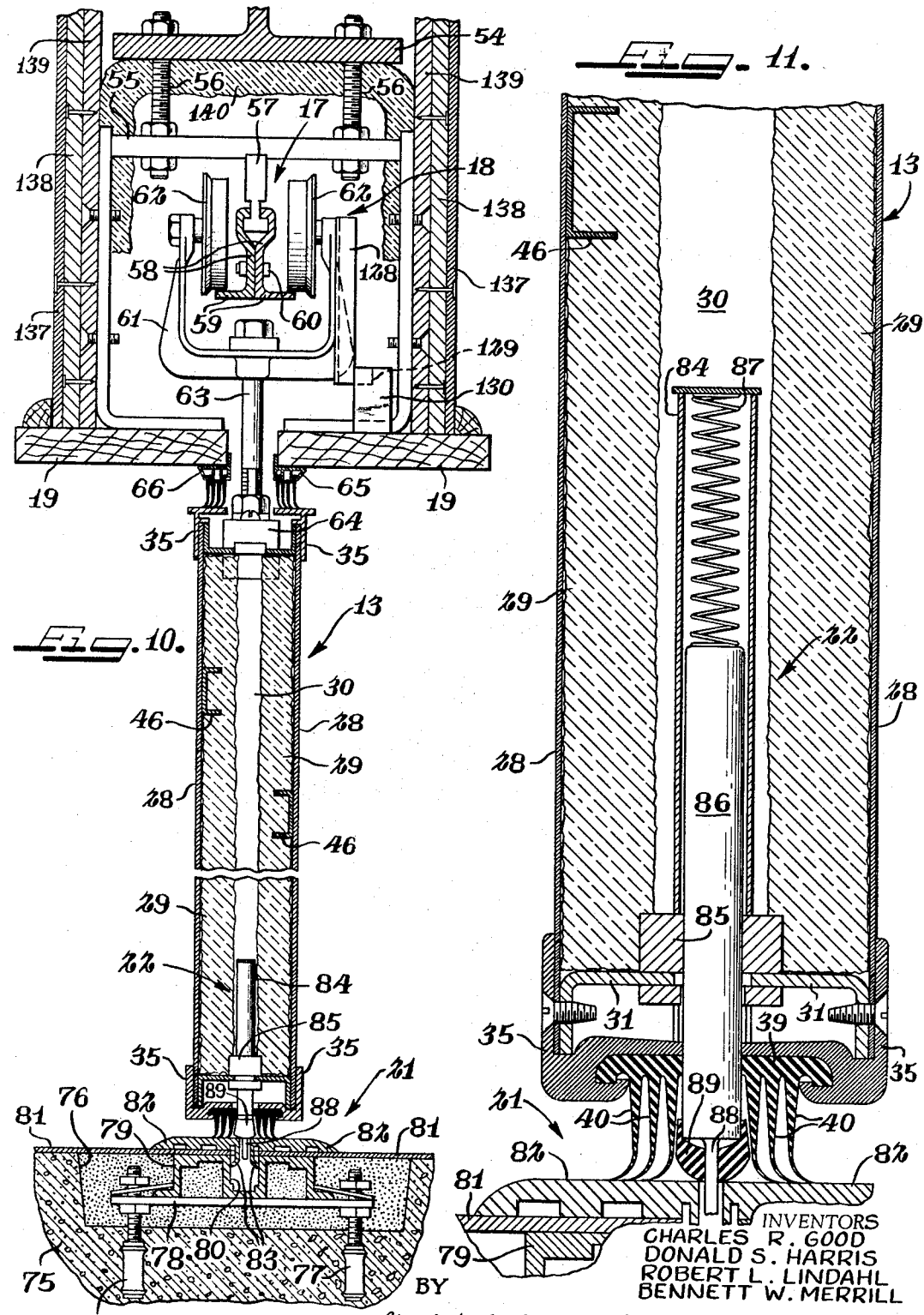

April 30, 1968 C. R. GOOD ET AL 3,380,506
MOVABLE SPACE DIVIDER STRUCTURE
Filed July 29, 1963 13 Sheets-Sheet 7

INVENTORS
CHARLES R. GOOD
DONALD S. HARRIS
ROBERT L. LINDAHL
BENNETT W. MERRILL
BY Greist, Lockwood, Greenawalt & Dewey
Attys.

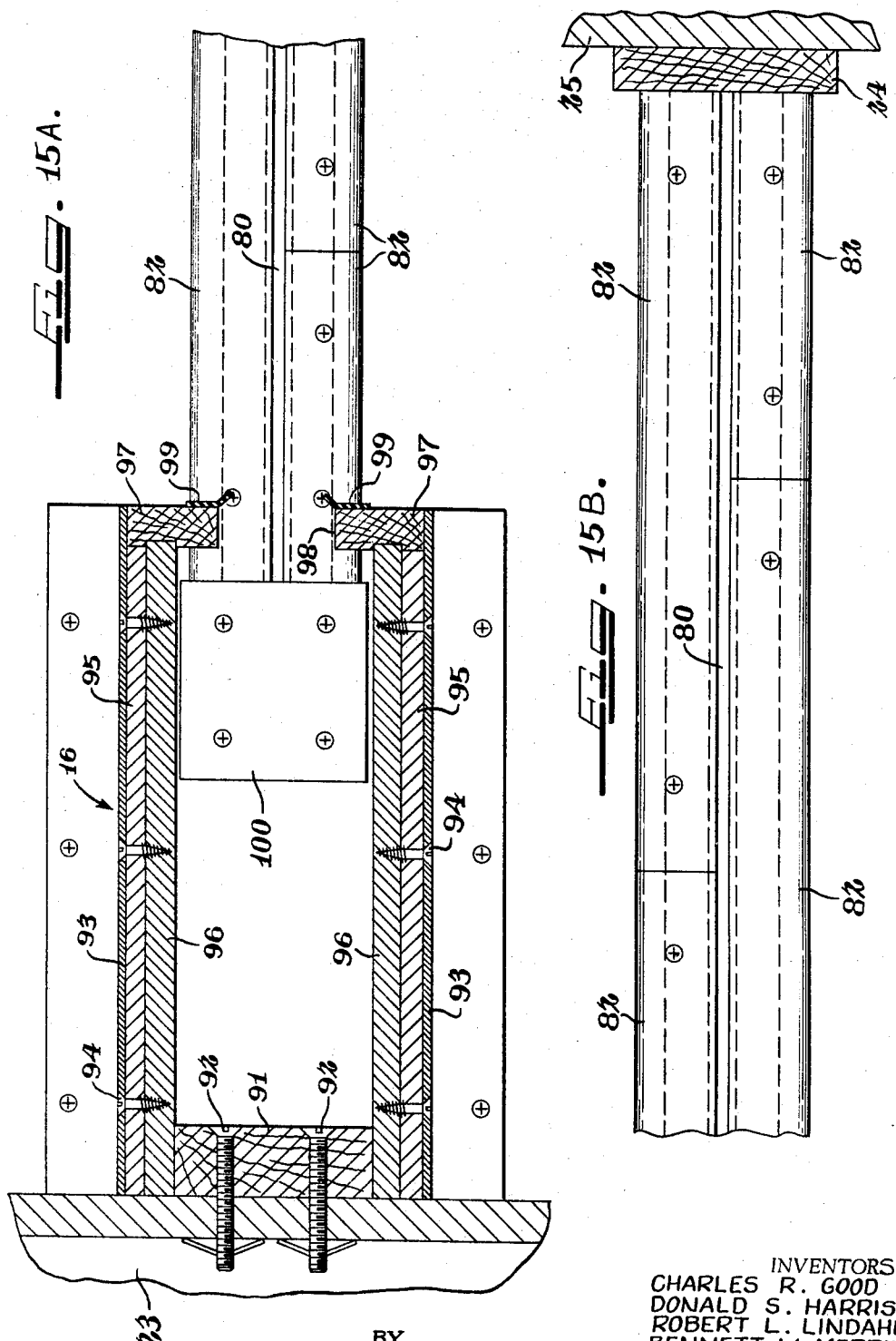

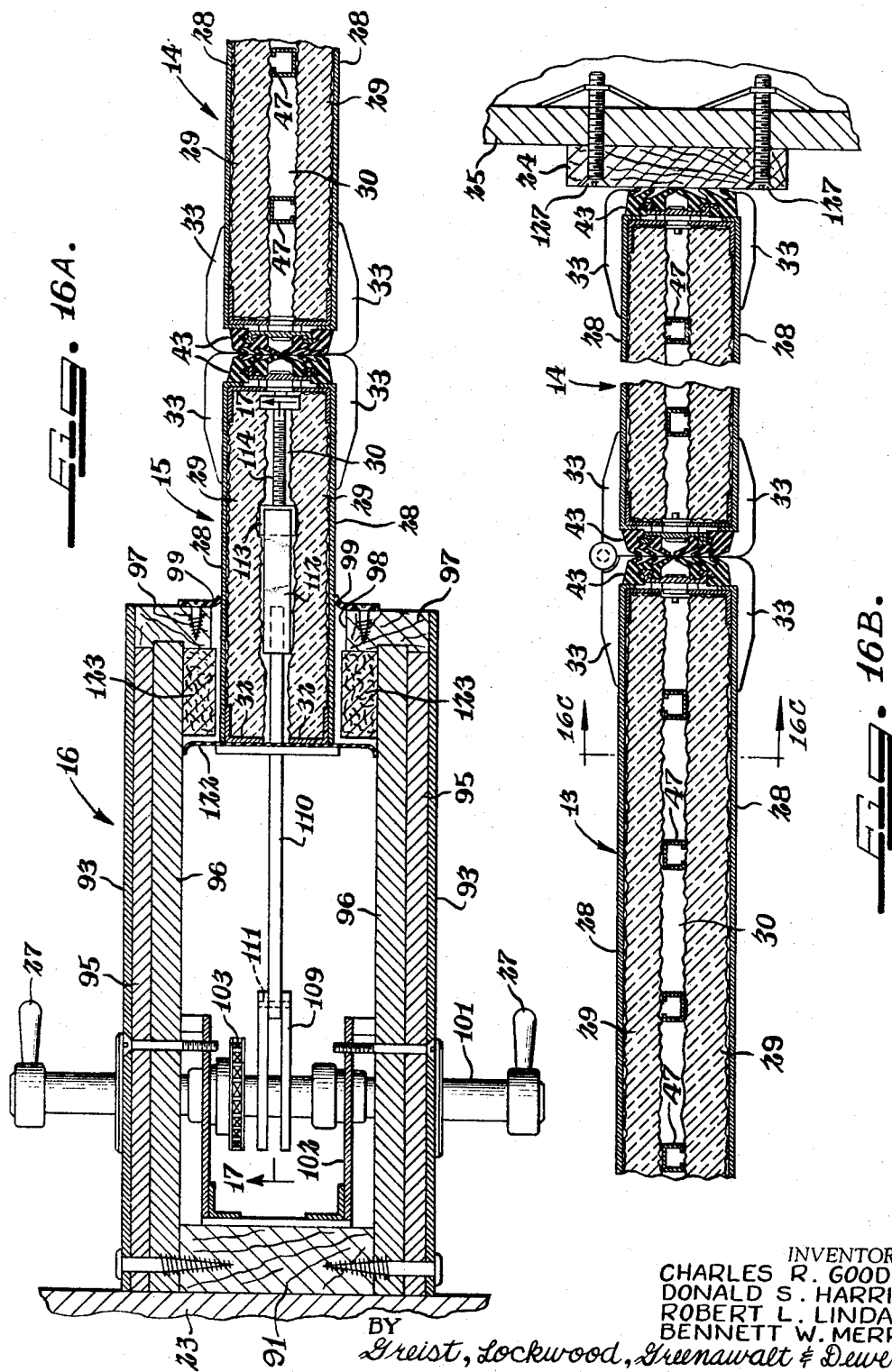

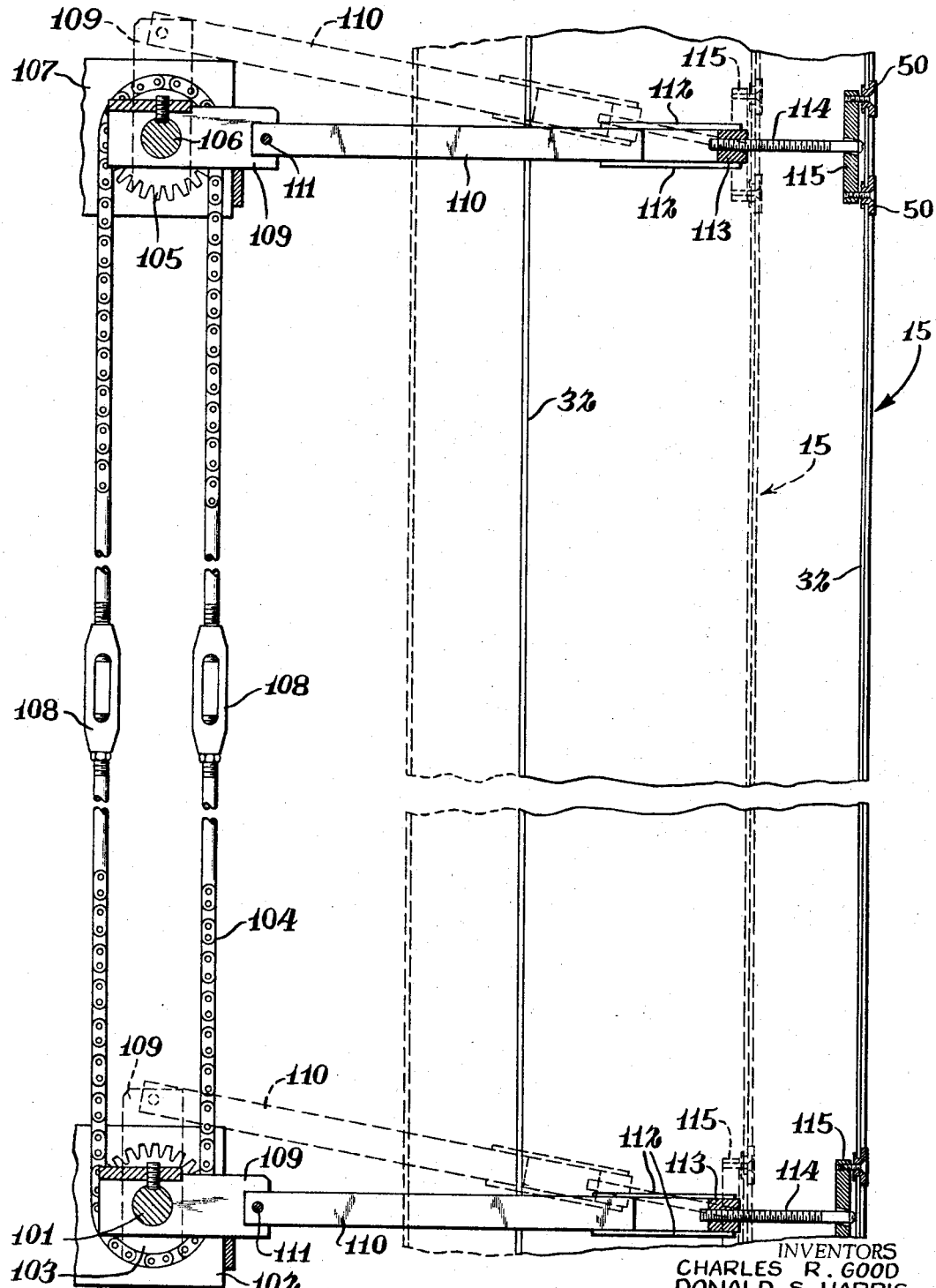

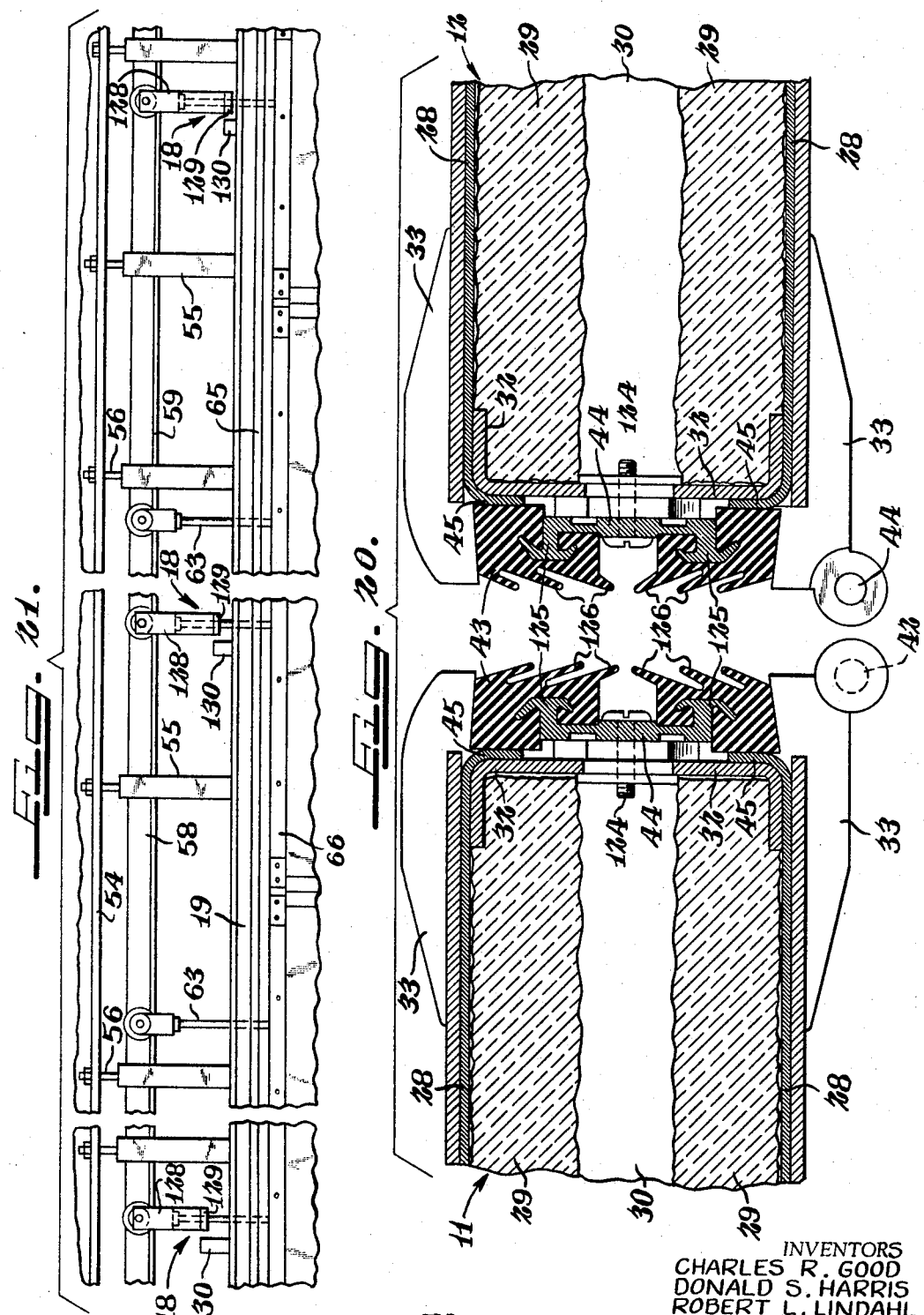

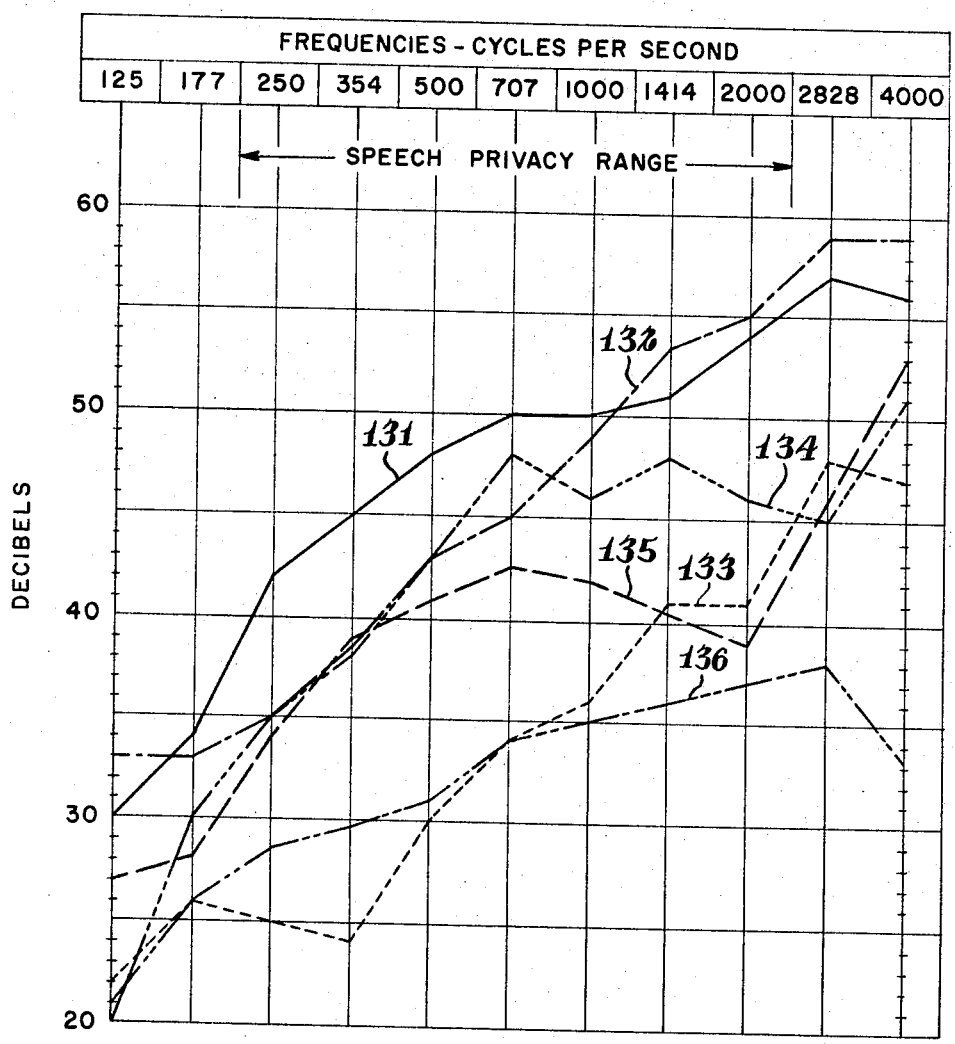

United States Patent Office 3,380,506
Patented Apr. 30, 1968

3,380,506
MOVABLE SPACE DIVIDER STRUCTURE
Charles R. Good, Springport, and Donald S. Harris, New Castle, Ind., Robert L. Lindahl, Trenton, Mich., and Bennett W. Merrill, New Castle, Ind., assignors to New Castle Products, Inc., New Castle, Ind., a corporation of Indiana
Filed July 29, 1963, Ser. No. 298,367
4 Claims. (Cl. 160—40)

The invention relates to a movable space divider structure formed from a plurality of panels arranged for coplanar positioning, the panels being movable into a stacked storage position when the divider is not in use. More specifically, the invention is directed to a new and improved panel structure capable of providing improved sound insulation and a new and improved divider mounting and sealing arrangement, the features of the improvements mutually cooperating to provide substantially improved sound insulation and ease of divider operation.

Space dividers of the coplanar panel type are often referred to as operable walls in that they function to provide a movable wall section for space isolation purposes. Such structure must be capable of providing a relatively high sound transmission loss function as the primary purpose for using such structures is for sound insulation purposes. With such structures an attempt is made to approach the sound insulating advantages of a fixed wall while retaining mobility.

With the operable wall type divider being intended as a substitute for a fixed rigid wall construction, the mass and weight of the divider must be confined within limits permitting ready movement of the panels thereof into and out of operative space dividing relation. Substantial efforts have been made to design a divider panel capable of providing adequate sound transmission loss characteristics in the speech privacy range and yet be readily movable by hand preferably without necessitating the use of power operating means. Such panels should also be capable of economic fabrication. Solid wood panel construction is used but the general rigidity of the panel is detrimental to efficient sound insulation as the panel basically functions as a single sounding diaphragm and in the established speech privacy range of from about 250 to 2000 cycles per second, the solid wood panel is not particularly efficient. Known panel structure also include face plates receiving therebetween a fill of mineral fibers such as rock wool or the like, and while the internal fiber fill is generally efficient as a sound absorber, it has been found that the sound transmission loss in the speech privacy range, particularly at the lower frequencies thereof, is not as great as might be expected. Available panel structures also include face plates enclosing therebetween a honeycomb core material which is capable of providing a degree of sound insulation. However, here again the sound transmission loss characteristics of such a panel does not favorably compare to conventional fixed wall construction.

Panel construction constitutes a special problem not only from the stanpoints of cost and weight control, but also in view of the fact that the many construction materials available for use will not necessarily function as expected when different combinations of the same are used. The selection of appropriate materials even under circumstances where cost, weight, and ease of fabrication do not present problems, involves consideration of rather complex sound transmission phenomena. For example, avoidance of diaphragm type action is essential. In this respect acoustical limpness of the material used is an important factor but structural rigidity of movable panels is essential. Often in acquiring adequate structural rigidity, diaphragm type action occurs thus reducing the inherent sound insulation qualities of the materials used. Additionally, the problem of coincidence cannot be overlooked as the presence of surface undulations or ripples caused by sound waves striking a panel at an angle will often materially reduce the sound insulation properties of a generally efficient material. In this respect glass meets the basic requirements of a good sound insulating material from the standpoint of structural makeup as it is quite homogenous and dense. However, a glass panel does not provide a sufficient sound transmission loss function largely due to its inability to avoid coincidence.

In addition to the problems of selective combination and fabrication of various materials, the establishing and maintaining of an efficient sound seal above, below and along the sides of each panel is essential to efficient use of a divider as a sound barrier. Peripheral leakage can make even the most efficient panel construction ineffective. Peripheral sealing of the panels into and out of operative position is an important consideration of the effectiveness of a space divider of this type.

It is an object of the invention to provide a new and improved movable space divider structure exhibiting highly effective sound transmission loss characteristics and capable of ready and efficient operation into and out of operative position.

A further object is to provide a new and improved sound insulating structure adapted for use as a panel member in a movable space divider assembly, the insulating structure including a special combination of elements and materials arranged in a new and improved manner to provide improved sound insulating properties.

Still another object is to provide a new and improved panel structure and peripheral sealing arrangement for use in a folding type space divider, the combined panel structure and sealing arrangement providing for improved efficiency in sound insulation.

A further object is to provide a new and improved panel sealing arrangement for use in a movable space divider structure, the arrangement providing for efficient sound insulation, ready manufacture and assembly, and ready and efficient space divider operation.

Still a further object is to provide a new and improved space divider sealing arrangement including operable means for locking a series of panels arranged in coplanar relation in efficient end sealing relation.

Other objects not specifically set forth will become apparent from the following detailed description of the invention made in conjunction with the accompanying drawings wherein:

FIG. 1 is a fragmentary elevation of the movable space divider structure of the invention illustrating the same in operative position;

FIG. 2 is a diagrammatic fragmentary plan view of the structure of FIG. 1 illustrating the panel portions thereof in inoperative stacked relation in broken lines;

FIG. 3 is a fragmentary elevation of one of the panels of the divider structure of FIG. 1;

FIG. 4 is an enlarged fragmentary vertical section of the panel of FIG. 3 as viewed generally along line 4—4 therein;

FIG. 5 is a fragmentary elevation of adjacent end portions of a pair of panels prior to hinge interconnection thereof;

FIG. 6 is a fragmentary end elevation of one of the panels;

FIG. 7 is a fragmentary exploded perspective of a half portion of a panel illustrating the particular components and arrangement thereof;

FIG. 8 is an enlarged fragmentary vertical section of one half portion of the panel in its assembled condition as would be viewed generally along line 8—8 in FIG. 7;

FIG. 9 is a fragmentary plan view of the panel portion as viewed generally along line 9—9 in FIG. 8;

FIG. 10 is an enlarged fragmentary vertical section of the divider structure of FIG. 1 as viewed generally along line 10—10 therein;

FIG. 11 is an enlarged fragmentary section of the bottom portion of a panel illustrating operation thereof in floor track means as shown in FIG. 10;

FIGS. 15A and 15B are fragmentary sections of the divider structure of FIG. 1 as viewed generally along line 15—15 therein;

FIGS. 16A and 16B are fragmentary longitudinal sections of the divider structure of FIG. 1 as viewed generally along line 16—16 therein;

FIGURE 16C is a longitudinal cross-sectional view taken generally along the lines 16C—16C in FIGURE 16B;

FIG. 17 is an enlarged fragmentary section of the operating means of the divider structure as viewed generally along line 17—17 in FIG. 16A;

FIG. 18 is an enlarged fragmentary section of a portion of the operating means as viewed generally along line 18—18 of FIG. 19;

FIG. 19 is a fragmentary end view of the operating means as viewed generally along line 19—19 in FIG. 18;

FIG. 20 is an enlarged composite section of adjacent panel end portions illustrating the sealing means forming a part thereof, this view being taken generally along line 20—20 of FIG. 5;

FIG. 21 is an enlarged fragmentary elevation of the overhead track means and panel support arrangement of the divider structure based on the illustration of FIG. 1; and FIG. 22 is a graph of comparative sound transmission loss curves of different types of sound insulating structures.

Figure 12:
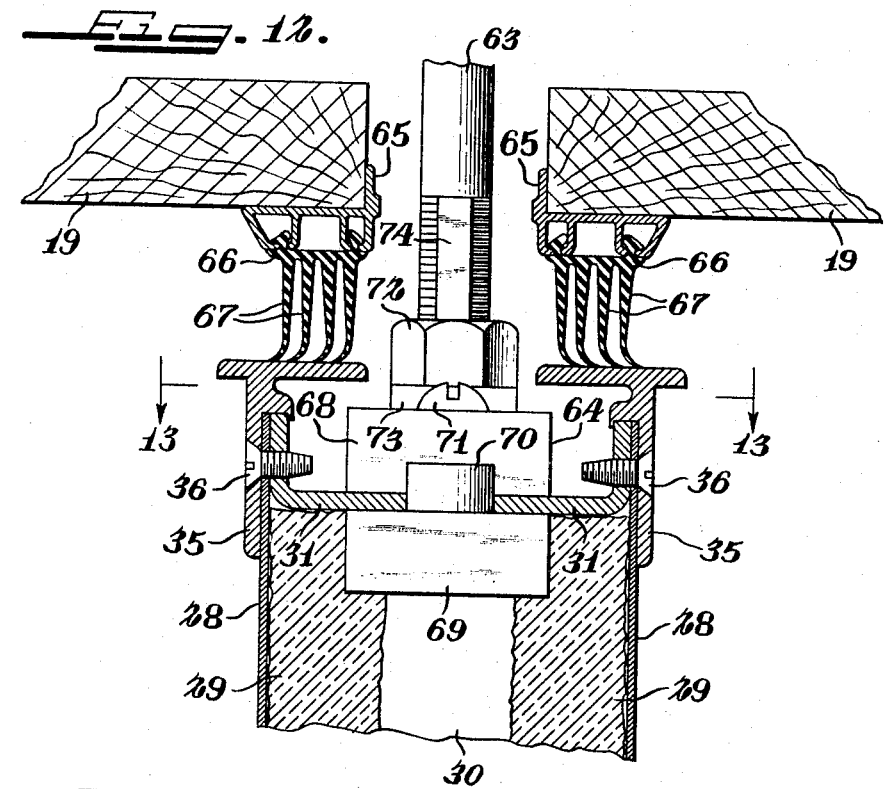
FIG. 12 is an enlarged fragmentary section of the top portion of a panel and the sealing arrangement thereof also generally shown in FIG. 10.

FIG. 1 illustrates the movable space divider structure 10 of the invention as comprising a plurality of flat panels arranged in hingedly paired relation. The panel arrangement includes any appropriate number of full panels 11 and 12 hingedly interconnected at top and bottom corner portions, hingedly interconnected opposite end pairs of full panels 13 and ¾ panels 14, and a longitudinally movable jamb panel 15 telescopically received in a fixed jamb housing 16 at one end of the structure. In addition to the panel arrangement, the structure includes an overhead recessed track assembly 17 supporting a plurality of trolley assemblies 18 thereon and which are suitably attached to the top portions of the various panels. The trolley assemblies 18 extend downwardly through a special ceiling panel structure 19. The floor structure 20 carries a special floor track assembly 21 in which is received a plurality of panel guide means 22.

The fixed jamb housing 16 extends vertically continuously between the ceiling panel structure 19 and floor structure 20 and is fixed to a side wall portion 23 which defines one end of the opening in which the space divider is received. A vertical jamb post 24 is mounted along the opposite fixed side wall portion 25 completing the surrounding structure defining the opening in which the divider is received.

FIG. 2 illustrates the general arrangement and in broken lines shows the stacking of the pairs of panels when the space divider structure is in its inoperative position. Handle means 26 are provided with each hingedly interconnected pair of panels to permit movement of the panels into folded position as controlled by movement of their respective trolley assemblies 18. The folded panels can then be readily moved longitudinally of the opening into the stacked position illustrated in broken lines in FIG. 2. The fixed jamb housing 16 includes therein jamb panel operating means controlled by exposed handle means 27 which upon operation provides for movement of the jamb panel 15 into and out of the jamb housing 16.

FIGS. 3–9 illustrate the panel construction, it being borne in mind that each of the panels of the divider are of similar construction. FIGURE 16C illustrates the assembled panels in broken longitudinal cross section while FIGURE 16B illustrates the panel in transverse cross section. FIG. 4 illustrates the panel 11 as including transversely spaced and generally co-extensive face plates 28 each having a fiber blanket 29 covering the inner face thereof. The fiber blankets 29 are spaced transversely from one another to define an air space 30 internally of the panel. Each face plate 28 peripherally thereof has attached thereto a frame-like member which, as best shown in FIG. 7, includes vertically spaced horizontal angle members 31 and longitudinally spaced vertical angle members 32. The angle members 31 and 32 peripherally frame the fiber blankets 29.

Referring particularly to FIGS. 3–6, the top and bottom corner portions of the panel 11 are provided with bracket-like members of which two are hinge brackets 33 and two are corner brackets 34. Intermediate edge members 35 extend between the corner brackets 33 and 34 and all of these elements are suitably attached by fasteners 36 to the longitudinal angle members 31. The top corner brackets 33 and 34 and intermediate edge members 35 each include a horizontal top flange portion 37 (FIG. 4) for outer surface sealing engagement with sealing strip means carried by the ceiling panel structure 19. The bottom corner brackets 33 and 34 and intermediate edge members 35 include continuous channels 38 in which a continuous bottom sealing strip 39 is suitably received and locked. The bottom sealing strip 39 includes laterally spaced series of depending flexible lip portions 40 adapted for resilient engagement with the floor track assembly 21.

FIG. 5 illustrates adjacent ends of pairs of panels adapted for hinged interconnection such as the panels 11 and 12. Alternate hinge brackets 33 include a hinge pin 41 or a recess 42 for interconnection of the adjacent panels. Each end surface of each panel includes an end sealing arrangement involving a special vertically continuous sealing strip 43 suitably mounted in a channel member 44 which extends vertically of the panel.

Each panel is basically of two-piece construction with each side portion on opposite sides of the internal air space 30 being identical. FIG. 7 illustrates a typical side portion including the face plate 28 having flange-like opposite end surface portions 45 for wrapping around the vertical angle members 32 as illustrated in FIG. 20. For adequate structural rigidity each plate 28 may preferably have attached thereto along the inner surface thereof one or more longitudinally extending reinforcing channels 46. The peripheral frame including the angle members 31 and 32 is received against the inner surface of the plate 28 and the fiber blanket 29 is received within the frame defined by the angle members 31 and 32. While the fiber blanket 29 is readily pliable, it preferably is suitably scored or cut to readily fit into and around the reinforcing channels 46 as shown in FIG. 8. In this manner the entire inner surface of the plate 28 will be completely covered by the fiber blanket 29. This blanket is retained in place by one or more vertically extending channel members 47 which are attached at opposite ends by straps 48 to the top and bottom angle members 31 as shown in FIGS. 8 and 9. The retainers 47 include outwardly projecting tongues 49 which are excised from the material thereof and which project into the fiber blanket 29 to maintain the same in the assembly. In this manner each half portion of a panel constitutes a complete sub-assembly adapting the same for efficient manufacture.

The half portions of each panel are interconnected by spacer members 50 best illustrated in FIGS. 7 and 19. Each spacer 50 includes a hexagonal top flange 51, an intermediate apertured sleeve portion 52, and a bottom annular flange portion 53 which is axially spaced from the hexagonal flange 50. The spacing is such that opposite edge portions of juxtaposed angle members 31 and 32 are received between the spaced flanges 51 and 53 and are welded or otherwise sutiably attached to the spacers. In this manner the side portions of each panel are interconnected using a plurality of spacers which are peripherally spaced so as to avoid a completely rigid structure. The spacers 50 are of sufficient width to space the side portions of each panel adequately to define the air space 30 between the same.

Each plate 28 of a panel is preferably relatively thin and formed from dense, non-porous, impermeable, acoustically limp and structurally stable material. These are rather substantial requirements but a steel plate meets these requirements in the particular environment described. Basically the plate should be structurally stable to an extent that it substantially resists elongation. The plate is not required to carry a vertical load so it can be thin enough to be acoustically limp. With each of the panels being suspended from the overhead track assembly the plates 28 are stressed only in tension and accordingly can be quite thin, the thinness in conjunction with the reinforcing feature and damping effect of the fiber blanket minimizing rippling due to the angular contact of sound waves therewith.

The fiber blanket is of any suitable limp fiber construction basically incapable of transmitting mechanical energy and capable of absorbing such energy as a result of frictional movement between the fibers thereof. Inorganic fibers such as glass and rock wool are particularly useful. The fiber blanket 29 is mounted in such a manner so as to retain its limpness and preferably the blanket will not be secured to the inner face of the adjacent plate 28 such as by the use of adhesive or the like. By maintaining the blanket 29 independent of the adjacent plate 28, frictional sliding movement can occur between the blanket and the plate as a result of sound vibration of the plate. The fiber blanket is especially adapted to absorb the mechanical energy of such relative movement and this type of blanket is generally inert with regard to vibration transmission. The plate 28 also provides a plane surface capable fo suitable decoration by the application of paint or fabric. The panel construction is completely incombustible thus meeting the fire control requirements of building structures.

The intermediate air space 30 is also of particular importance in the special panel construction. The air space 30 provides for substantial separation between the opposite side portions of the panel and any bowing or bending of one of the portions relative to the other is readily accommodated to minimize the transmission of such movement to the remaining side portion. In this respect it is important to minimize the degree of rigid interconnection between the side portions of a panel in order to utilize the advantages of the air space to the greatest extent possible. The basic framing of the side portions of the panel is maintained at a minimum and the angle members 31 and 32 of each side portion are not rigidly interconnected throughout any substantial extent thereof. The spacers 50 provide a minimized interconnection sufficient to maintain structural stability and yet avoid any substantial peripheral transmission of vibrations from one side portion of the panel to the other. In further avoiding the incorporation of transverse rigidity, the retainer members 47 are preferably longitudinally spaced and thus staggered as best illustrated in FIGS. 16A and 16B. In this respect the retainer members 47 of opposite side portions of a panel cannot contact one another in the event of movement of one side portion and do not provide means whereby vibration can be transmitted from one side portion to the other. The reinforcing channels 46 are confined to their respective side portions of the panel and will not impart any transverse rigidity to the panel. Preferably the channels 46 of each side portion are staggered or offset transversely relative to those of the cooperating side portion to avoid transverse rigidity.

FIGS. 10–15 illustrate the top and bottom sealing arrangements of the space divider structure. Considering first the manner in which each panel is suspended from the overhead track assembly 17, the installation of the space divided 10 illustrated involves a drop ceiling arrangement including an I-beam 54 shown in FIGS. 1, 10 and 21 supporting therefrom a plurality of strap hangers 55 on adjustable bolts 56. The hangers include a depending grooved support 57 having clamped thereto a two-piece track including a pair of longitudinally continuous track members 58 each having an upper hook-like portion engaging the spaced supports 57 and each having a bottom outwardly projecting flange 59, the track members 58 being detachably engaged by fasteners 60.

Figure 14A:
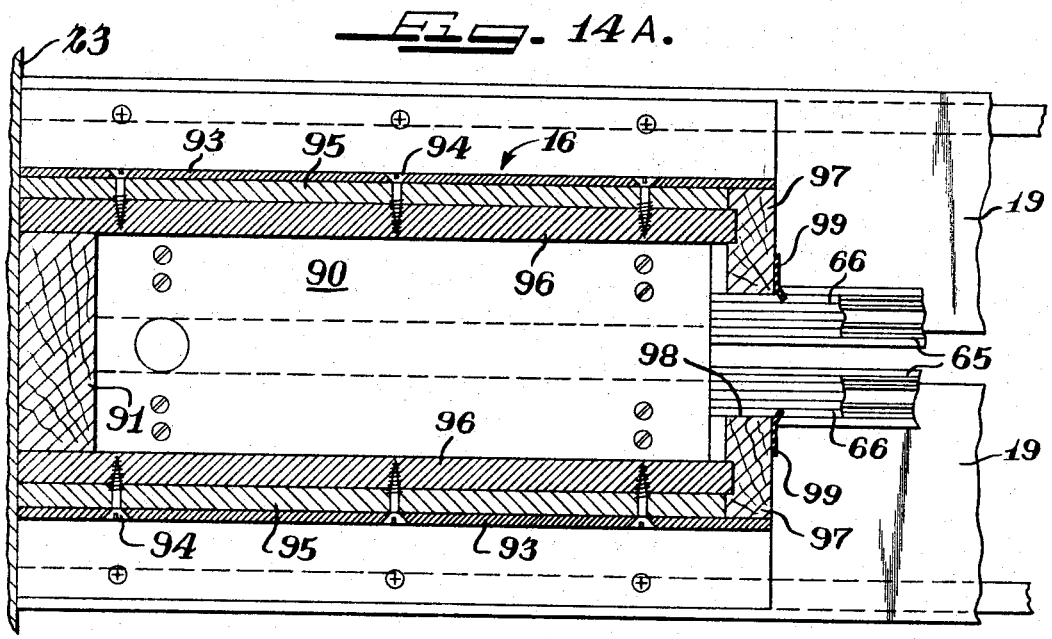
FIGS. 14A and 14B are fragmentary longitudinal sections of the divider structure of FIG. 1 as viewed generally along line 14—14 therein.
Figure 14B:
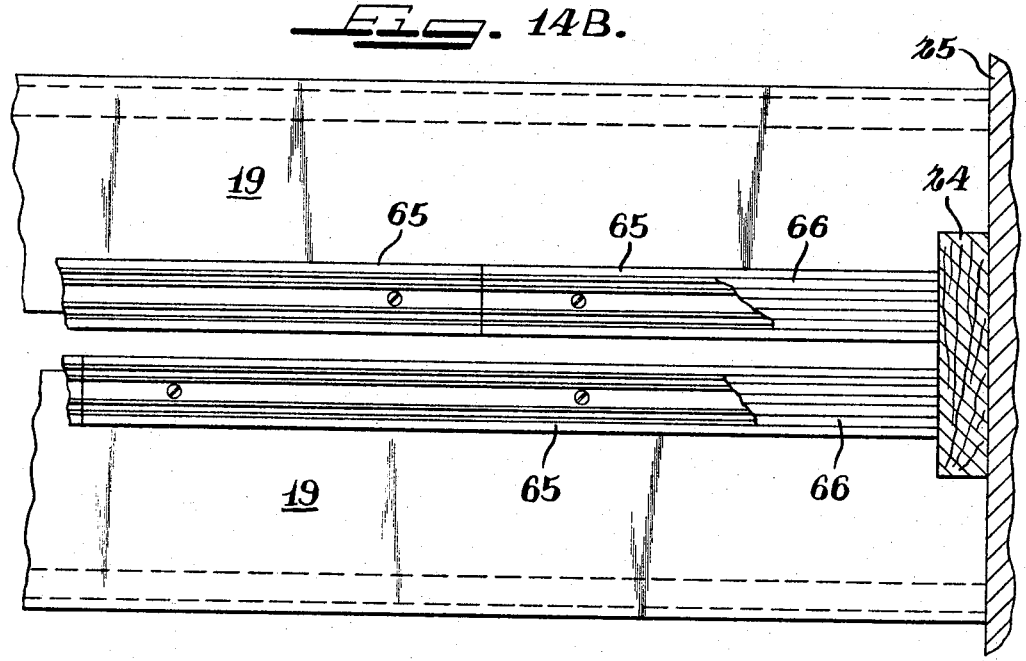

Each trolley assembly 18 includes a U-shaped member 61 mounting flanged rollers 62 at the top thereof in supported engagement with the flanges 59. A pivotal trolley bolt 63 extends downwardly from the member 61 and is attached to a block assembly 64 fixed to the top longitudinal angle members 31 of a panel. The bolts 63 extend downwardly through a longitudinally continuous space defined by ceiling panel members 19 located in the same plane as the ceiling of the building surrounding the space divider opening. The ceiling panel members 19 along bottom inner edge portions thereof have mounted thereto longitudinally continuous channel members 65 and best shown in FIG. 12. These channel members are arranged in a longitudinally continuous manner as shown in FIGS. 14A and 14B. Multiple lip sealing strips 66 are suitably mounted in the channel members 65 to each side of the ceiling panel opening. Each of these strips includes a plurality of depending and readily flexible sealing lips 67 arranged to engage the flat top surfaces of the flange portions 37 of the corner brackets 33 and 34 and intermediate edge members 35. When the panels are in coplanar relation the sealing strips 66 provide a longitudinally continuous top seal thus preventing sound transmission along the top periphery of the space divider structure.

Figure 13:
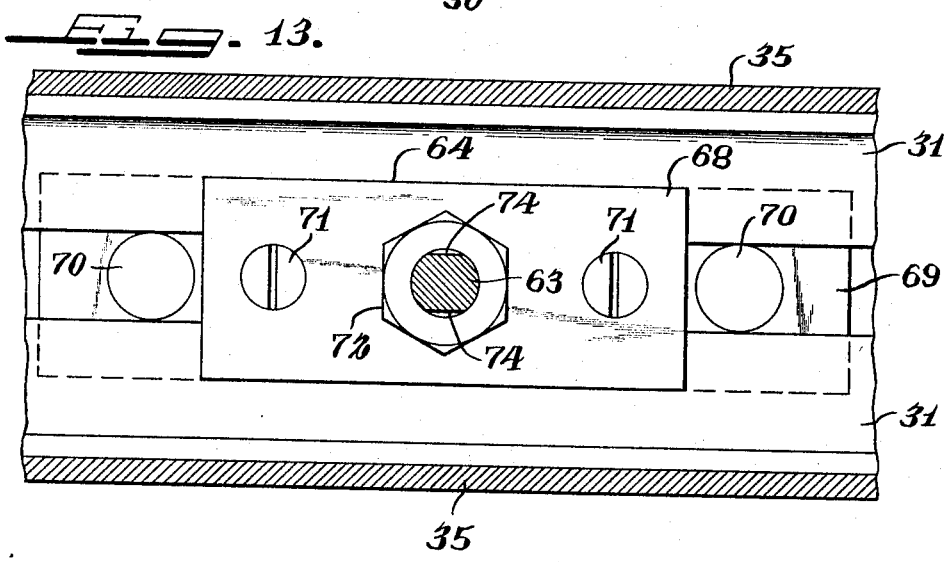
FIG. 13 is a fragmentary plan section of the top portion of a panel as viewed generally along line 13—13 in FIG. 12, this view being turned 90° for ease of consideration.

Each trolley bolt 63 as previously described is attached to a block assembly 64 of a panel. Each block assembly as shown in FIGS. 12 and 13 includes top and bottom block members 68 and 69, respectively, clamping therebetween inner edge portions of the top angle members 31 of a panel. The bottom block member 69 projects longitudinally beyond the top block member 68 at opposite ends thereof and includes spaced upwardly projecting dowel portions 70 which are dimensioned to be snugly received between opposite edges of the angle members 31 thus locking the block assembly in place. Suitabe fasteners 71 extend through the top and bottom block members to removably fix the same in a panel. The trolley bolt 63 is formed with a bottom threaded end portion which is threadedly received through the top and bottom block members 68 and 69 and a locknut 72 and lock washer 73 are received on the bolt to lock the same relative to the block assembly. The threaded end portion is preferably provided with opposite flatted surfaces 74 by means of which a tool may be applied to the bolt to threadedly adjust the same relative to the block assembly and hold the same during final placement of the locknut and washer.

The panel top surface sealing arrangement described is of particular important in conjunction with the utilization of a recessed track structure. The sealing strips 66 extending continuously along opposite sides of the ceiling opening permit communication between the recessed track area and the air space 30 in each panel. It will be borne in mind that the spacers 50 and trolley bolt block assemblies 64 are spaced along the top surface portions of the panels thus permitting air flow between the panel air spaces 30 and the air space in the recessed track area. A completely enclosed dead air space confined within a panel structure, and even in wall structures, can transmit vibrations. The air in a completely confined air space can be compressed by the vibrations of a side portion of the wall and thereby transmit the vibrations to the remaining side portion of the wall. The air in the air space 30 of each panel can move freely upwardly into the track area between the sealing strips 66 thus providing a greater air space volume and minimizing air compression to avoid an undesirable degree of sound transmission. Furthermore, this free exchange of air between relatively remote spaces permits a reduction in the over-all thickness of the panel while retaining efficient sound transmission loss characteristics. Thus the air in the air space 30 of the panel functions as a spring further contributing to the extent of sound transmission loss.

FIGS. 10 and 11 best illustrate the floor track assembly 21. An aggregate floor structure 75 is illustrated. A trough portion 76 is either removed from or formed in the floor 75, this trough extending longitudinally of the space divider opening. Leveling fasteners 77 are fixed in the floor 75 projecting upwardly into the trough area and supporting thereon a plurality of transverse straps 78 which are arranged with longitudinal spacing. A continuous channel member 79 is supported on the straps 78 and suitably fixed thereto, the channel member including an upwardly opening longitudinally continuous channel 80 which is exposed at the surface of the floor. The trough area 76 is then filled with suitable aggregate material and floor covering 81 is laid in the known manner to cover the channel member 79 to the edge of the upwardly opening channel 80. A floor surface cover plate 82 is applied in sections over the floor covering 81 along opposite sides of the channel 80 and longitudinally continuously of the divider structure opening as shown in FIGS. 15A and 15B. Each plate 82 includes an inner edge depending flange 83 which overextends the adjacent edge of the channel 80 and projects downwardly and transversely into the channel. In this manner the plates substantially seal off the channel 80 and materially reduce the available width thereof to receive therein the guide means 22 of the panels.

As best shown in FIG. 11, each guide means 22 includes a tubular housing 84 mounted within a panel in the bottom portion of the air space 3d thereof between the fiber blankets 29. The housing is carried on an attachment block 85 which is of similar configuration as a spacer 50 and which interconnects adjacent edges of the bottom angle members 31 of a panel. The housing 84 receives therein a guide rod 86 which slidably extends through the block 85 and through a suitable opening formed in the bottom sealing strip 39 downwardly between the laterally spaced series of multiple sealing lips 40. The rod 86 at its uppermost end is loaded by a coil spring 87 confined in the housing 84 and the bottom end of the rod is formed with an integral guide pin 88 which is received between the depending flanges 83 of the floor surface cover plates 82. The lower end of the guide rod may have received thereon a cup-like bumper member 89 which rides along the adjacent surfaces of the plates 82 and which is apertured to receive the guide pin 88 therethrough. The bumper 89 not only permits quiet operation but also further aids in maintaining a complete seal along the bottom edge of the divider structure. The laterally spaced series of multiple lips 40 of the sealing strips 39 engage the top surfaces of the floor plates 82 in the coplanar position of the panels and maintain a complete seal longitudinally of the space divider structure. The provision of laterally spaced series of multiple lips precludes the necessity of completely sealing off the bottom edges of the panels by means of structural elements which would tend to impart rigidity to the panels.

FIG. 14A illustrates the top structure of the fixed jamb housing 16 as including a top filler plate or board 90 suitably attached to the ceiling. A vertically extending back post 91 is suitably attached to the side wall portion 23 by fasteners 92 located at any suitable interval such as shown in FIG. 15A. The vertical sides of the housing 16 include face plates 93 of any suitable type, such as the plates 28 of the panels, these plates being decorated in the same manner as the panel plates. The plates 93 are suitably attached by fasteners 94 to side wall members 95 and 96 extending vertically continuously and formed from any suitable structural material including such material particularly adapted for sound insulation. In this respect the fixed jamb housing may be of any appropriate construction as long as the same is capable of establishing a sound transmission loss which is at least comparable to that of the panels. However, the critical problems of panel construction are not present in the fabrication of the fixed jamb housing as weight limitations are not present and the jamb housing is substantially thicker than the individual panels thereby providing greater latitude in the type of materials used. In this respect the structure of the housing 16 can at least approach that of an effective fixed wall.

Transverse end closures 97 extend between the face plates 93 and the top and bottom seal assemblies as shown in FIGS. 14A and 15A and further extend vertically continuously to define therebetween an opening 98 through which the movable jamb panel 15 is operable. The outer surfaces of the vertical end members 97 have attached thereto vertically continuous sealing members 99 having inwardly projecting flexible lip portions which engage the outer side surfaces of the movable jamb panel 15 to seal off the interior of the jamb housing 16. The bottom portion of the jamb housing as shown in FIG. 15A is similarly constructed and includes a plate member 100 sealing off the adjacent end of the floor recess in which the channel member 79 is mounted.

As shown in FIG. 16A, the jamb panel 15 is of the same structure as the panels described above but is of lesser width, approximately ½ the width of a full panel, as it merely moves a relatively short distance into and out of the fixed jamb housing 16. It will be understood that the jamb panel may be of any suitable width depending on the extent of movement desired. The housing 16 at convenient operating height includes a transverse operating shaft 101 suitably journaled therein and projecting from opposite sides thereof with operating handle means 27 being fixed thereto. Internally the shaft 101 is supported by a bracket structure 102 suitably fixed within the housing 16 and carries thereon a drive sprocket 103 also illustrated in FIG. 17. A drive chain 104 extends upwardly from the sprocket 103 into engagement with an upper sprocket 105 suitably fixed to an idler shaft 106 (FIGS. 1 and 17) which is supported within the housing 16 by bracket means 107. The drive chain 104 includes adjustable turnbuckles 108 for ready assembly and adjustment thereof.

Each shaft 101 and 106 has fixed thereto a bifurcated crank arm 109 projecting outwardly therefrom in a direction longitudinally of the space divider structure. The outer end of each crank arm has pivotally attached thereto a bar member 110 by means of a transverse pivot pin 111. The outer end of each bar member 110 has fixed thereto a pair of spaced straps 112 projecting therefrom and fixing between the outer ends thereof an adjustment collar 113 which threadedly receives therethrough an adjustment bolt 114.

As best shown in FIGS. 18 and 19, the outer end of each adjustment bolt 114 projects through an attachment block 115 which is fixed by fasteners 116 to spacers 50 arranged along the outermost end surface of the movable jamb panel 15. In this respect the spacers 50 can serve multiple functions not only for the purpose of interconnecting the side portions of a panel, but also for attachment of various operating elements such as those forming a part of the operating means of the movable jamb panel. The block 115 includes a central bore 117 provided with an inclined enlargement 118 communicating with the inner surface thereof to permit the bolt 114 to pivot relative to the block in an upward direction. The bolt 114 is retained in the block 115 by a transverse rollpin 119 suitably fixed in a transverse groove extending through the opening 117 and seated in an annular groove 120 formed in the bolt 114. The outer bottom surface portion 121 of the aperture 117 is enlarged downwardly to permit rocking of the bolt 114 about the axis of the rollpin 119.

Rotation of the shaft 101 by either of the handle means 27 in a counterclockwise direction as viewed in FIG. 17 results in a lifting of the crankarms 109 and the inclining and retraction of the bars 110 accompanied by appropriate movement of the jamb panel 15 into the jam housing 16. This operation is illustrated in broken lines in FIG. 17. Retraction of the jamb panel 15 results in the longitudinal releasing of the panels of the space divider structure thus permitting the same to be folded relative to one another and moved into stacked relation as shown in FIG. 2. When the panels are moved from a stacked relation into coplanar positioning during closing of the structure, operation of the jamb panel 15 into the position shown in FIGS. 16A and 17 results in longitudinal outward movement of the jamb panel into tight engagement with the adjacent end of the panel 14. The degree of travel afforded the jamb panel 15 by the operating means is sufficient to force all of the panels longitudinally of the structure into locked, tight end surface engagement thus establishing automatically a complete vertical edge seal between the adjacent panels brought about by adequate mutual compression of juxtaposed end surface sealing strips 43. Adjustment of this travel is readily accomplished by tool engagement of the exposed slotted ends of the bolts 114.

While the jamb panel 15 is sealed relative to the housing 16 by the vertically continuous sealing strips 99, the inner end surface of the jamb panel will preferably include thereon a transverse sealing strip 122 which as shown in FIG. 16A engages the opposed inner surfaces of the side wall members 96 of the housing 16. This additional seal further assures complete soundproofing along the tortuous path defined by the relatively moving jamb panel 15. Additionally, the jamb housing 16 may include a pair of vertically continuous fiber blankets 123 located immediately inwardly of the opening of the housing through which the jamb panel 15 moves to thus further establish complete soundproofing. Actually, it is preferable to substantially fill the jamb housing 16 with fiber blankets in virtually all dead space areas and without interfering with jamb panel operation.

The panel sealing arrangements are of particular importance as any peripheral leakage would destroy the advantage gained from the use of the uniquely constructed panel. The sealing strips 66 of the overhead sealing arrangement do not move with the panels but are readily available to efficiently engage the top surfaces thereof when the same are placed in coplanar position. The fixing of the overhead sealing strips 66 in the opening does not interfere with efficient use of the opening. The mounting of the bottom sealing strips 39 on the panels avoids the presence of an obstacle during passage through the opening and avoids damage to the strips. However, the bottom strips 39 preferably should not engage the floor surface as undue wear can result and dirt and other foreign particles may become adhered to the sealing lips and destroy the effectiveness thereof as a result of the movement of the panels. Accordingly, the special floor surface cover plates 82 provide special advantages in that they supply a raised surface which does not constitute an obstacle to complete use of the opening and yet permits efficient sealing action with the sealing strips 39 carried along the bottoms of the panels. Furthermore, the cover plates 82 can be readily removed to fully expose the channel 80 to clean the same. Foreign matter will accumulate in the channel and such an accumulation may interfere with efficient movement of the panels. Thus the bottom sealing arrangement avoids several disadvantages while providing ease of assembly and maintenance.

FIGS. 16A, 16B and 20 best illustrate the panel end surface sealing arrangement including the sealing strips 43 and removable end plate 44. Each end plate 44 is removably attached to a panel by fasteners 124 received in spacers 50 located along the ends of the panel. The plate 44 includes side marginal flange portions 125 about which a sealing strip 43 is received and retained vertically of the end surface of the panel. Each sealing strip includes laterally spaced series of multiple flexible lip portions 126 which in each series are preferably inwardly slanted in their relaxed condition. The lips of adjacent series are inwardly and opposite directed. When the panels are forced together by the movable jamb panel 15 into end engagement, adjacent sealing strips 43 readily combine as best shown in FIGS. 16A and 16B into flattened engagement with the engaging lip portions thereof being directed in opposition to the movement of sound waves from either side of the space divider structure. Thus if sound is of sufficient intensity to move past a series of lips slanted in the same direction of movement of the sound, the opposite series will be directly opposed to such direction of movement and no sound leakage results. The special and appreciable slanting of the lip portions 126 permits automatic positive positioning thereof when the panels are sealed relative to one another. The operator need not be concerned with the possibility of misalignment or misdirection of the lips in view of the special arrangement. The panel 14 which is located adjacent the fixed jamb post 24 is forced into outer end sealing strip engagement with the jamb post 24 by operation of the jamb panel 15. This sealing arrangement is shown in FIG. 16B and the sealing strip 43 of the endmost panel 14 establishes an efficient seal with the outer surface of the jamb post 24. The jamb post 24 is suitable fixed to the opposite side wall portion 25 by fasteners 127.

FIGS. 10 and 21 best illustrate a panel stop arrangement preferably used in the space divider structure of the invention. One hanger member 61 of each pair of panels includes a vertically extending plate 128 along a side thereof and provided with an outwardly projecting flange-like foot portion 129. One of the ceiling panel members 19 along the top surface thereof includes a vertical stop member 130 which projects sufficiently to engage one of the foot portions 129 of a trolley assembly. FIG. 21 illustrates progressive variation of the relative vertical positioning of the foot members 129 and height of the stop members 130 to permit movement of selected pairs of panels from the stacked position of FIG. 2 toward the fixed jamb housing 16 into their general operative position. Thus the hinged panels 13 and 14 immediately adjacent the fixed jamb post 24 are not permitted to move past the first stop member 130 illustrated at the right hand portion of FIGS. 1 and 21. The middle hinged panels 11 and 12 are permitted to move past the first stop member 130 but are contacted by the intermediate stop member 130. The remaining hinged panels 13 and 14 arranged for positioning immediately adjacent the fixed jamb housing 16 are permitted to move past the first and intermediate stop members 130 but are engaged by the remaining stop member 130 viewed at the left hand portion of FIGS. 1 and 21. This particular arrangement permits an operator to readily position the panels for movement into coplanar relation and immediate locking thereof by operation of the movable jamb panel 15.

FIG. 22 illustrates comparative sound transmission loss curves of different structures including the space divider structure and special panels of the present invention, the curves having been prepared as a result of standard tests in accordance with A.S.T.M. procedures. FIG. 22 covers sound transmission loss characteristics limited basically to the well established speech privacy range which varies generally from 250 to 2000 cycles per second. The sound transmission loss values are set forth in decibels in accordance with standard testing procedures.

Curve 131 represents the sound transmission loss characteristics of the space divider structure of the present invention within the speech privacy range. Curve 132 illustrates the sound transmission loss characteristics of an 8 inch thick concrete block wall having a weight of 50 pounds per square foot. Curve 133 represents the sound transmission loss characteristics of a 4 inch thick light aggregate block wall having a weight of 20 pounds per square foot and including two spray coats of wall paint on both sides. Curve 134 sets forth the sound transmission loss characteristics of a commercial space divider structure of the same general classification as that of the invention but including different peripheral sealing means and a panel construction of steel face plates completely filled with rock wool therebetween. Curve 135 sets forth the sound transmission loss characteristics of a conventional stud and plaster fixed wall including wooden studs of 2 inches by 4 inches with 16 inches on center and ⅜ inch gypsum lath with ½ inch coating of sanded plaster on both sides, the wall having a weight of 13.4 pounds per square foot. Curve 136 sets forth the sound transmission loss characteristics of another form of commercial space divider structure using a peripheral sealing arrangement and panels formed from steel face plates with an intermediate 2¾ inches thick honeycomb core completely filling the area between the face plates.

From the foregoing comparative curves it will be particularly noted that the space divider of the present invention provides substantially improved sound transmission loss characteristics especially in the lower frequency portion of the speech privacy range. This is of particular importance as the lower frequencies are often the most difficult to control. A sound impulse applied to a panel at a lower frequency permits a greater period of time for the components of the panel to be moved or flexed. However, impulses applied against a panel at higher frequencies provide less time for the panel to move or flex thus permitting greater ease of sound transmission control.

On an over-all basis the general performance of the subject structure as identified by the curve 131 is substantially improved over the general performances of the various structures with which it is compared. Curve 131 is generally flat, as for example compared to curves 134 and 135, which indicates substantially uniform efficiency in operation over the entire speech privacy range. It is often the case that selected sound insulating structures will provide efficient sound transmission loss characteristics in selected portions of the speech privacy range but will fail to provide a good generally linear performance over the entire range. In many instances, such as glass panels or the like, non-linear performance in specific portions of the speech privacy range is due to the effect of coincidence. Thus the structure of the present invention not only provides a high over-all sound transmission loss performance but also provides generally uniform characteristics without the presence of selected frequency inefficiencies.

The structure of the invention readily adapts itself to efficient utilization and accommodation of static insulating materials. For example, under certain conditions of use it is preferable to insulate the overhead track assembly 17 as shown in FIG. 10 without detracting from its use as an air transfer area. The ceiling panel members 19 may have mounted thereon within the drop ceiling structure a series of insulating panels such as a plywood panel 137, a gypsum board 138 and an inner plywood panel 139, all of which are suitably fixed to the hangers 55. A fiber blanket 140 may be draped over the hangers 55 and extend downwardly between the same, such blanket also functioning to reduce the noise of trolley operation.

Obviously certain modifications and variations of the invention as hereinbefore set forth may be made without departing from the spirit and scope thereof, and therefore only such limitations should be imposed as are indicated in the appended claims.

We claim:

1. A sound insulating structure adapted for use in a movable space dividing unit, said structure comprising laterally spaced and at least substantially co-extensive face plates formed from structurally stable and acoustically limp and acoustically impermeable material, support means attached to each of said plates and interconnected transversely of said structure at peripherally spaced intervals to provide a unitary structure without establishing continuous sound transferring rigidity between said plates, separate limp fiber blanket means overlying the inner face of each plate in at least substantially unsecured relation therewith, said blanket means being separated centrally of said structure to define an internal air space which is at least substantially co-extensive with said plates, and retainer means for holding said blanket means at spaced points in unsecured relation with the inner face of each plate to permit slight movement relative thereto.

2. In a folding space divider assembly wherein a plurality of panels are arranged for coplanar positioning in end-to-end sealing engagement, each panel being movably suspended from a supporting structure, said panels extending from top edge sealing engagement with said supporting structure into bottom edge sealing engagement with a floor structure, the improvement comprising each panel having laterally spaced and at least substantially co-extensive face plates formed from structurally stable and acoustically limp and acoustically impermeable material, support means attached to each of said plates and interconnected transversely of said panel at pheripherally spaced intervals to provide a unitary structure without establishing continuous sound transferring rigidity between said plates, separate limp fiber blanket means overlying the inner face of each plate, said blanket means being separated centrally of said structure to define an internal air space which is at least substantially co-extensive with said plates, and retainer means holding said fiber blanket means against the inner face of each of said plates in unsecured relation to permit slight movement relative thereto.

3. In a folding space divider assembly wherein a plurality of panels are arranged for coplanar positioning in end-to-end sealing engagement, each panel being movably suspended from a supporting structure, said panels extending from top edge sealing engagement with said supporting structure into bottom edge sealing engagement with a floor structure, the improvement comprising each panel having laterally spaced and at least substantially co-extensive face plates formed from structurally stable and acoustically limp and acoustically impermeable material, support means attached to each of said plates and interconnected transversely of said panel at spaced intervals to provide a unitary structure without establishing continuous sound transferring rigidity between said plates, separate limp fiber blanket means overlying the inner face of each plate in unsecured relation therewith, said blanket means being separated centrally of said structure to define an internal air space which is at least substantially co-extensive with said plates, and flexible sealing strip means extending along each end surface of a panel for mutual compressive sealing engagement between adjacent panels, said sealing strip means including a series of opposed transversely deflectible lip portions which in their compressed condition are oppositely directed transversely of engaging panel ends.

4. A space divider assembly comprising a series of panels arranged for coplanar positioning in end-to-end sealing engagement, overhead track means recessed in a ceiling structure and including trolley means suspending said panels, first sealing strip means extending between said overhead track means and the top portions of said panels to continuously seal the area between said overhead track means and said panels in the coplanar positioning of said panels, second sealing strip means extending along end surfaces of said panels for compressive engagement with adjacent panels to vertically seal said assembly in the coplanar positioning of said panels, floor surface track means forming a part of said assembly and receiving panel guide means therein, third sealing strip means extending between the bottom portions of said panels and said floor surface track means to continuously seal the area between said panels and floor surface track means in the coplanar positioning of said panels, manually operable jamb means arranged for engagement with one end surface of a panel after said panels are in coplanar position to force said panels into end surface sealing engagement longitudinally of said assembly forming an effective acoustical barrier in the coplanar positioning of said panels, said jamb means being manually retractable to permit release of force on said panels for ease of unstacking, each of said panels including laterally spaced and at least substantially co-extensive face plates formed from structurally stable, acoustically limp and acoustically impermeable material, support means attached at peripherally spaced locations to each of said plates and interconnected transversely of said panel at spaced intervals to provide a unitary structure without establishing continuous sound transferring rigidity between said plates, and separate limp fiber blanket means overlying the inner face of each plate in unsecured relation therewith, said blanket means being separated centrally of said panel to define an internal air space which is at least substantially co-extensive with said plates.

References Cited

UNITED STATES PATENTS

| | | | |
|---|---|---|---|
| 885,703 | 4/1908 | Stose | 20—12 |
| 1,893,147 | 1/1933 | Oberdorfer et al. | 160—40 |
| 1,931,125 | 10/1933 | Balduf | 181—33.12 |
| 1,990,259 | 2/1935 | Walters | 52—404 X |
| 2,079,878 | 5/1937 | Sabine | 20—35 |
| 2,085,436 | 6/1937 | Maurer | 52—404 X |
| 2,111,326 | 3/1938 | Norris | 52—404 X |
| 2,299,573 | 10/1942 | Fairhurst | 20—19 |
| 2,573,160 | 10/1951 | Norman | 20—19 |
| 2,610,681 | 9/1952 | Schaap | 160—229 |
| 2,696,279 | 12/1954 | Schofield | 52—404 |
| 2,929,445 | 3/1960 | Haws | 160—40 X |
| 3,130,775 | 4/1964 | Walker | 160—172 |
| 2,027,992 | 1/1936 | Maurer | 160—199 X |
| 3,235,915 | 2/1966 | Glaser | 20—69 X |

DAVID J. WILLIAMOWSKY, *Primary Examiner.*

REINALDO P. MACHADO, HARRISON R. MOSELEY, *Examiners.*

D. L. TAYLOR, *Assistant Examiner.*

UNITED STATES PATENT OFFICE
CERTIFICATE OF CORRECTION

Patent No. 3,380,506                                      April 30, 1968

Charles R. Good et al.

It is hereby certified that error appears in the above numbered patent requiring correction and that the said Letters Patent should read as corrected below.

Column 1, line 24, "structure" should read -- structures --; line 46, "structure" should read -- structures --; line 59, "stanpoints" should read -- standpoints --. Column 2, line 17, after "sealing" insert -- arrangements cannot be unduly complex as ease of movement --. Column 5, line 47, "fo" should read -- of --. Column 6, line 11, "divided" should read -- divider --; line 55, "suitabe" should read -- Suitable --; line 69, "important" should read -- importance --. Column 7, line 47, "3d" should read -- 30 --. Column 9, line 17, "jam" should read -- jamb --. Column 10, line 10, "plate", first occurrence, should read -- plates --; line 41, "suitable" should read -- suitably --. Column 11, line 26, "13.4" should read -- 14.3 --. Column 12, line 36, "pheriperally" should read -- peripherally --.

Signed and sealed this 23rd day of September 1969.

(SEAL)
Attest:

EDWARD M. FLETCHER, JR.                       WILLIAM E. SCHUYLER, JR.
Attesting Officer                                   Commissioner of Patents